United States Patent
Sasaki et al.

(10) Patent No.: US 10,601,632 B2
(45) Date of Patent: *Mar. 24, 2020

(54) COMMUNICATION APPARATUS, SYSTEM, METHOD, AND NON-TRANSITORY MEDIUM FOR SECURING NETWORK COMMUNICATION

(71) Applicant: NEC Corporation, Tokyo (JP)

(72) Inventors: Takayuki Sasaki, Tokyo (JP); Adrian Perrig, Zurich (CH); Srdjan Capkun, Zurich (CH); Claudio Soriente, Zurich (CH); Ramya Jayaram Masti, Zurich (CH); Jason Lee, Zurich (CH)

(73) Assignee: NEC Corporation, Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 15/572,871

(22) PCT Filed: May 11, 2015

(86) PCT No.: PCT/JP2015/002385
§ 371 (c)(1),
(2) Date: Nov. 9, 2017

(87) PCT Pub. No.: WO2016/181423
PCT Pub. Date: Nov. 17, 2016

(65) Prior Publication Data
US 2018/0159716 A1    Jun. 7, 2018

(51) Int. Cl.
*H04L 29/06* (2006.01)
*G06F 21/53* (2013.01)
(Continued)

(52) U.S. Cl.
CPC ........ *H04L 29/06578* (2013.01); *G06F 21/42* (2013.01); *G06F 21/53* (2013.01);
(Continued)

(58) Field of Classification Search
CPC ...................... G06F 21/53; G06F 2009/45587
See application file for complete search history.

(56) References Cited

U.S. PATENT DOCUMENTS

| 7,870,153 B2 | 1/2011 | Croft et al. |
| 7,949,677 B2 | 5/2011 | Croft et al. |

(Continued)

FOREIGN PATENT DOCUMENTS

EP    1 475 709 A2    11/2004

OTHER PUBLICATIONS

McCune, J. M., et al., "TrustVisor: Efficient TCB Reduction and Attestation," 2010 IEEE Symposium on Security and Privacy, IEEE, pp. 143-158 (May 16, 2010) (18 pages).
(Continued)

*Primary Examiner* — Thaddeus J Plecha
(74) *Attorney, Agent, or Firm* — Wilmer Cutler Pickering Hale and Dorr LLP

(57) ABSTRACT

A communication apparatus comprising a plurality of communication processes, each of the communication processes configured to be executed in an environment allocated thereto and isolated from each of one or more environments arranged for remaining one or more processes, each of the communication processes performing communication processing on a flow associated thereto, a network interface connected to a network; a dispatcher that dispatches a packet to the communication process based on a dispatch rule that defines association of a flow with a communication process.

18 Claims, 16 Drawing Sheets

(51) Int. Cl.
G06F 21/42 (2013.01)
G06F 9/455 (2018.01)
H04L 12/715 (2013.01)

(52) U.S. Cl.
CPC ........ *H04L 29/06986* (2013.01); *H04L 63/02* (2013.01); *G06F 2009/45587* (2013.01); *H04L 45/64* (2013.01); *H04L 63/0227* (2013.01)

(56) References Cited

U.S. PATENT DOCUMENTS

| | | | |
|---|---|---|---|
| 7,954,150 | B2 | 5/2011 | Croft et al. |
| 8,010,679 | B2 | 8/2011 | Low et al. |
| 8,051,180 | B2 | 11/2011 | Mazzaferri et al. |
| 8,117,314 | B2 | 2/2012 | Croft et al. |
| 8,146,147 | B2 | 3/2012 | Litvin et al. |
| 8,261,317 | B2 | 9/2012 | Litvin et al. |
| 8,336,094 | B2 | 12/2012 | Litvin et al. |
| 8,341,270 | B2 | 12/2012 | Mazzaferri et al. |
| 8,341,732 | B2 | 12/2012 | Croft et al. |
| 8,355,407 | B2 | 1/2013 | Wookey et al. |
| 8,892,878 | B2 | 11/2014 | Tucker et al. |
| 2004/0226019 | A1 | 11/2004 | Tucker et al. |
| 2007/0171921 | A1 | 7/2007 | Wookey et al. |
| 2007/0174410 | A1 | 7/2007 | Croft et al. |
| 2007/0174429 | A1 | 7/2007 | Mazzaferri et al. |
| 2007/0179955 | A1 | 8/2007 | Croft et al. |
| 2007/0180447 | A1 | 8/2007 | Mazzaferri et al. |
| 2007/0180448 | A1 | 8/2007 | Low et al. |
| 2007/0180449 | A1 | 8/2007 | Croft et al. |
| 2007/0180450 | A1 | 8/2007 | Croft et al. |
| 2007/0180493 | A1 | 8/2007 | Croft et al. |
| 2007/0186212 | A1 | 8/2007 | Mazzaferri et al. |
| 2007/0192329 | A1 | 8/2007 | Croft et al. |
| 2007/0198656 | A1 | 8/2007 | Mazzaferri et al. |
| 2008/0151893 | A1* | 6/2008 | Nordmark ............... H04L 45/00 370/392 |
| 2009/0249438 | A1 | 10/2009 | Litvin et al. |
| 2009/0249470 | A1 | 10/2009 | Litvin et al. |
| 2009/0249471 | A1 | 10/2009 | Litvin et al. |
| 2009/0249472 | A1 | 10/2009 | Litvin et al. |
| 2013/0019277 | A1* | 1/2013 | Chang ................. H04L 63/0218 726/1 |
| 2015/0139238 | A1* | 5/2015 | Pourzandi ............... H04L 45/42 370/392 |
| 2015/0180769 | A1* | 6/2015 | Wang ..................... H04L 45/38 370/236 |
| 2016/0044035 | A1* | 2/2016 | Huang ................ H04L 63/0272 726/4 |
| 2017/0005916 | A1* | 1/2017 | Mathew .................. H04L 45/38 |
| 2017/0222878 | A1* | 8/2017 | Jacquin ................... H04L 41/28 |
| 2017/0223060 | A1* | 8/2017 | Hayes .................. H04L 63/205 |
| 2017/0324781 | A1* | 11/2017 | Hu ...................... H04L 63/0227 |

OTHER PUBLICATIONS

Medved, J., et al., "OpenDaylight: towards a Model-Driven SDN Controller Architecture," Proceedings of IEEE International Symposium on a World of Wireless, Mobile and Multimedia Networks, IEEE, 8 pages (Jun. 19, 2014).

Notification of Reasons for Refusal issued by the Japan Patent Office for Japanese Application No. 2017-559142 dated Aug. 21, 2018 (12 pages).

Rothenberg, Christian E., RouteFlow: Virtualized IP Routing Services in OpenFlow networks, Change & Ofelia Summer School Power Point Presentation, 20 pages (Aug. 1, 2014) (URL:<http://web.archive.org/web/20140801 2303417/http://changeofelia.info.ucl.ac.be/>).

International Search Report corresponding to PCT/JP2015/002385, dated Dec. 17, 2015 (3 pages).

Written Opinion corresponding to PCT/JP2015/002385, dated Dec. 17, 2015 (5 pages).

Seungwon Shin et al., "Rosemary: A Robust, Secure, and High-Performance Network Operating System," ACM 978-1-4503-2957, 2014 (12 pages).

Xitao Wen, "Towards a Secure Controller Platform for OpenFlow Applications," ACM 978-1-4503-2178, 2013, pp. 171-172.

Jonathan M. McCune, et al., "TrustVisor: Efficient TCB Reduction and Attestation," Carnegie Mellon Univ., CyLab-09-003, Mar. 9, 2009, (17 pages).

Jan Medved, et al., "OpenDaylight Update," Linux Foundation, Collaborative Projects, Nov. 2013, http://www.opendaylight.org, (15 pages).

Seungwon Shin, et al., "Avant-Guard: Scalable and Vigilant Switch Flow Management in Software-Defined Networks," ACM 978-14503-2477, 2013 (12 pages).

Ben Pfaff, et al., "OpenFlow Switch Specification," Version 1.0.0 (Wire Protocol 0xx01), Dec. 31, 2009, (42 pages).

* cited by examiner

FIG. 9C

| Controller Process | Start Address | End Address | Access Type |
|---|---|---|---|
| A | 0xC00100000 | 0xC004FFFFF | R/W |
| B | 0xC001FFFFF | 0xC003FFFFF | R |
| C | 0xC001FFFFF | 0xC002FFFFF | R |

COMMUNICATION APPARATUS, SYSTEM, METHOD, AND NON-TRANSITORY MEDIUM FOR SECURING NETWORK COMMUNICATION

CROSS-REFERENCE TO RELATED APPLICATIONS

The present invention is based upon and claims the benefit of the priority of International Application No. PCT/JP2015/002385 filed on May 11, 2015, the disclosure of which is incorporated herein in its entirety by reference thereto. The present invention relates to a communication apparatus, system, method and non-transitory medium storing a computer program.

BACKGROUND

The following outlines OpenFlow, as one example of SDNs (Software Designed Networks) that can dynamically set or change a configuration, function, or performance of a network base on a software. OpenFlow switch includes a flow table including a plurality of flow entries. Each flow entry includes a match field to be matched with header field information of a received packet, a counter field including statistics information such as the number of received packets and the number of received bytes, and an action field with zero or more actions that dictate how the switch handles a received packet whose header matches with the match field. Upon reception of a packet, the OpenFlow switch retrieves the flow table thereof using header field information of the packet. In the case of miss-hit (non-match), the OpenFlow switch forwards the packet to OpenFlow controller over a secure channel.

Based upon information on a source and a destination of the packet specified in the header thereof, the OpenFlow controller computes a path for the packet from network topology information. Based upon the path, the OpenFlow controller generates and sets a flow entry for each of OpenFlow switches on the path. On reception of following packets, each having a header matching with a match field of the flow entry set by the OpenFlow controller, each of the OpenFlow switches on the path forwards the packets to a next node, for example, as prescribed in the action field of the flow entry. Regarding details of OpenFlow, reference may be made to NPL 6.

There have been extensive research and development efforts on secure networking, especially in SDN to reduce network vulnerabilities to attacks.

In NPL (Non Patent Literature) 1, there is proposed ROSEMARY controller, which implements a network application containment and resilience strategy based around the notion of spawning applications independently within micro-NOS (network operating system).

In NPL 2, there is proposed PermOF coping with potential trust issue on OpenFlow applications, in which abuse of trust could lead to various types of attacks impacting an entire network. In PermOF, isolation of control flow and data is established between a controller and applications. OpenFlow applications are isolated from Controller kernel, that is, OpenFlow applications cannot call kernel procedures or directly refer to a kernel memory. There is provided Access control layer between OpenFlow applications and OS (Operating System). The layer is controlled by the Controller kernel, so that undesirable interaction between OpenFlow applications and OS would be cut off.

In NPL 3, there is proposed AVANT-GUARD, a new framework to advance security and resilience of OpenFlow networks with greater involvement from the data-plane layer. Connection migration enables data plane to shield control plane from saturation attacks. Actuating triggers automatically insert flow rules when the network is under attack.

In NPL 4, there is disclosed a secure hypervisor, called TrustVisor, to provide a safe execution environment for security-sensitive code modules without trusting OS or application that invokes the code module. TrustVisor is so designed as to protect security-sensitive code and data from malware, even on untrusted commodity platforms.

[NPL 1] Seungwon Shin et al., "Rosemary: A Robust, Secure, and High-performance Network Operating System", CCS'14

[NPL 2] Xitao Wen et al., "Towards a secure controller platform for openflow applications", HotSDN '13

[NPL 3] Seungwon Shin et al., "AVANT-GUARD: scalable and vigilant switch flow management in software-defined networks", CCS'13

[NPL 4] Jonathan M. McCune et al., "TrustVisor: Efficient TCB Reduction and Attestation", Mar. 9, 2009, (revised Mar. 10, 2010) CMU-CyLab-09-003, CyLab Carnegie Mellon University Pittsburgh, Pa. 15213

[NPL 5] Jan Medved, Reinaldo Penno, OpenDaylight Update, November 2013, Internet <URL: http://www.ietf.org/proceedings/88/slides/slides-88-netconf-6.pdf>

[NPL 6] "Openflow Switch Specification" Version 1.0.0. (Wire Protocol 0x01), Internet<URL: http://www.openflowswitch.org/documents/openflow-spec-v1.0.0.pdf

SUMMARY

The disclosures of NPLs 1 to 6 given above are hereby incorporated in their entirety by reference into this specification.

The following analysis is made by the inventors of the present invention.

NFL 1 and NPL 2 perform access control of Northbound API.

NPL 3 prevents DoS (Denial of Service) attack against control plane by filtering messages.

However, the security mechanisms may fail to confine damage to one network component or element, for example. In this case, one compromised component may damage an entirety of networks, thus resulting in deterioration in network security. The same may be said in such a case wherein the security mechanisms may fail to confine damage to one network, thus failing to prevent the damage from spreading over to other networks.

In view of the foregoing, it is an object of the present invention to provide an apparatus, method, non-transitory medium storing a program and system ensuring secure networking environments.

According to one aspect of the disclosure, there is provided a communication apparatus comprising:

a plurality of communication processes, each of the communication processes configured to be executed in an environment allocated thereto, the environment arranged for each of the communication processes being isolated from each of one or more environments arranged for remaining one or more communication processes, each of the communication processes performing communication processing on a flow associated thereto;

a plurality of network interfaces, each of the network interfaces adapted to be connected to a network; and a dispatcher that receives a packet from the network interface and dispatches the packet to an associated communication process, based on a dispatch rule that defines association of a flow with a communication process to which the flow is dispatched. The architecture of the communication apparatus may well be employed in a switch and also in a controller.

According to another aspect of the disclosure, there is provided a communication system comprising:

a switch;

a controller to control the switch, wherein the switch comprises:

a plurality of communication processes, each of the communication processes configured to be executed in an environment allocated thereto, the environment arranged for each of the communication processes being isolated from each of one or more environments arranged for remaining one or more communication processes, each of the communication processes performing communication processing on a flow associated thereto;

a plurality of network interfaces, each of the network interfaces adapted to be connected to a network; and a dispatcher that receives a packet from the network interface and dispatches the packet to an associated communication process, based on a dispatch rule that defines association of a flow with a communication process to which the flow is dispatched.

According to a further aspect of the disclosure, there is provided a communication method comprising:

dispatching a packet received by a switch to an associated switch process included in the switch, based on a dispatch rule that defines association of a flow with a switch process to which the flow is dispatched; and the associated switch process, out of a plurality of switch processes included in the switch, performing switch processing on a flow associated thereto, each of the plurality of switch processes being configured to be executed in an environment allocated thereto, the environment arranged for each of the switch processes being isolated from each of other one or more environments arranged for remaining one or more switch processes.

According to still another aspect of the disclosure, there is provided a non-transitory computer readable recording medium storing therein a program causing a computer to executing processes comprising:

a plurality of communication processes, each of the communication processes being executed in an environment allocated thereto, the environment arranged for each of the communication processes being configured to be isolated from each of other one or more environments arranged for remaining one or more communication processes, each of the communication processes performing communication processing on a flow associated thereto; and a dispatching process that receives a packet from the network interface and dispatches the packet to an associated communication process, based on a dispatch rule that defines association of a flow with a communication process to which the flow is dispatched.

According to the present invention, networking processes are isolated each other to ensure secure networking.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 9C is a diagram illustrating an example of access control information in the exemplary embodiment of the present invention.

DETAILED DESCRIPTION

Figure 1:
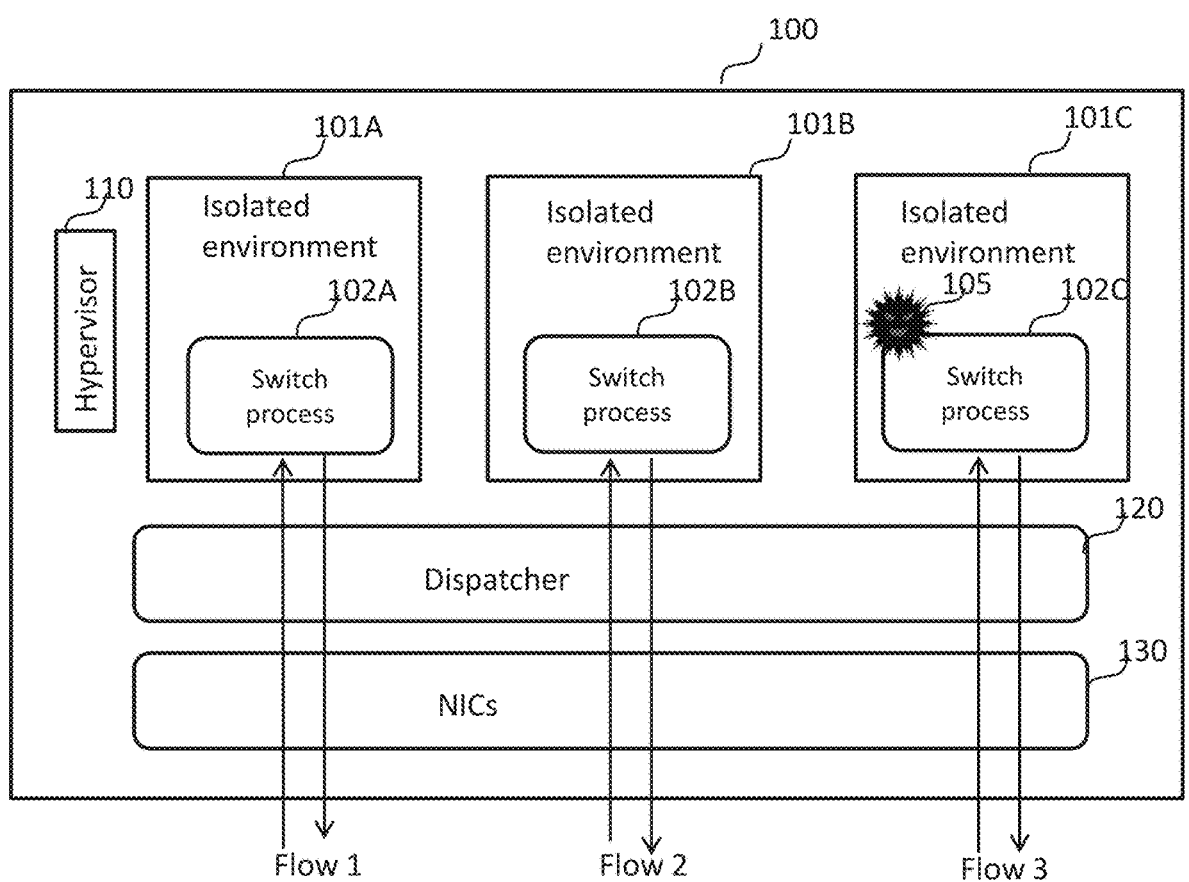
FIG. 1 is a diagram illustrating a configuration of a switch in an exemplary embodiment of the present invention.

The following describes exemplary embodiments of the present invention. FIG. 1 illustrates a switch in an exemplary embodiment. A switch 100 is configured to implement process isolation system, wherein a process is executed in an isolated environment. Referring to FIG. 1, the switch 100 includes a switch process 102 that is executed in an isolated environment 101, a hypervisor 110, a dispatcher 120 and network interface controllers (or network interface cards) (NICs) 130.

The dispatcher 120 arranged between NICs 130 and a plurality of switch processes 102, dispatches a flow (a packet received from NICs 130) to an associated switch process 102. The dispatcher 102 also dispatches a packet received from a switch process 102 to a corresponding port NICs 130 for output of the packet to a network. The dispatcher 120 may include a plurality of input ports (not shown), and a plurality of output ports (not shown), and forwards a packet received at an input port thereof to a target output port thereof, based on a dispatch rule that defines a correspondence between a flow and a switch process associated with the flow. The dispatcher 120 may be configured by a hardware switch with a controller, or a virtual switch implemented by software. A flow may be defined by predetermined header fields of a received packet, for example, one or a combination of source interface, protocol, source IP address, source port, a destination IP address, and destination port.

The hypervisor 110 creates an isolated environment 101 and a switch process 102 executed in the isolated environment 101. In FIG. 1, it is only for the sake of illustration that there are provided three isolated environments 101A-101C and three switch process 102A-102C therein. The number of isolated environments 101 and switch processes 102 is not, as a matter of course, limited to three and may be any integer not less than one.

The hypervisor 110 includes a computer software, firmware or hardware and adapted to control hardware resources. Though not limited thereto, in such an application to server virtualization, the hypervisor 110 may control a virtual machine (VM) including: virtualized hardware resources a guest OS and an application, wherein the virtualized hardware resources include virtualized CPU (Central Processing Unit), a virtualized storage, and a virtualized network, for example.

Isolation technology is an approach, where a process is executed in an isolated environment. Isolation technology provides a containment environment where a malware 105 can run without affecting an entire system. Any damage done by the malware is contained in an isolated environment 1010, for example. That is, even if a switch 102C is compromised by a malware 105, the malware 105 is confined to the isolated environment 101, it cannot affect other flows.

In the present exemplary embodiment, the hypervisor 110 provides memory isolation, though not limited thereto. A memory region (isolated area) assigned to the switch process 102A in the isolated environment 101A is isolated from other memory regions (isolated areas) assigned to other switch processes 102B and 102C in other isolated environments 101B and 101C and isolated from a memory region assigned to OS/Hypervisor or device driver (not shown), except a shared region shared by the switch processes and OS.

Figure 11A:
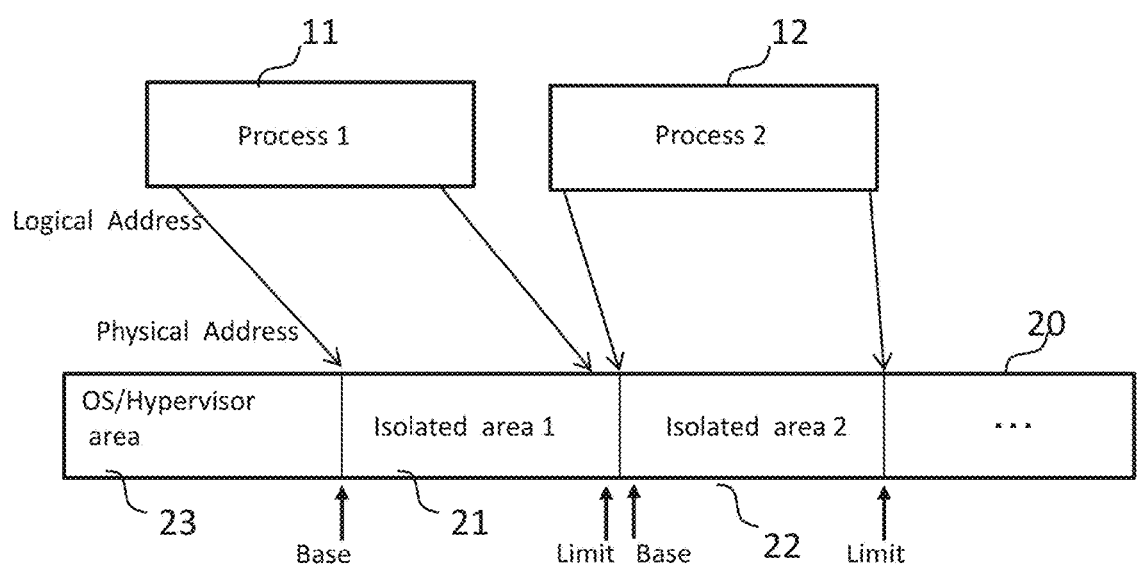
FIG. 11A is a diagram illustrating a memory isolation in the in the exemplary embodiment of the present invention.

FIG. 11A illustrates an example of a hypervisor or hardware based memory protection. As shown in FIG. 11A, isolated areas 1 and 2 (21, 22) allotted to processes 1 and 2 (11, 12) are separate memory regions in a memory 20. An OS/Hypervisor area 23 allotted to OS (Hypervisor) is different from isolated areas 1 and 2 (21, 22) allotted to processes 1 and 2 (11, 12) and hence OS (Hypervisor) is protected from the process (11, 12). Since memory spaces addressed by process (11, 12) are different, each process (11, 12) cannot have a memory access to an isolated area of the other process.

Though not limited thereto, hypervisor or hardware based MMU (Memory Management Unit) may performs address translation from a logical (virtual) address of each process to a physical address by using a relocation register (no shown) to which a base address of a memory space for the process is set. The base address in the relocation register and the logical address are added to generate the physical address. MMU also checks that the generated physical address is in a range defined by the base address and the limit address of the process. This functions as memory protection mechanism. When MMU detects an occurrence of memory access violation by a fault process, such as, accessing a memory space that the process has no access right, or accessing outside the range defined by the base address and the limit allotted to the process is detected, the fault process may be notified of addressing error by trap, or aborted with notification of addressing error.

Figure 11B:
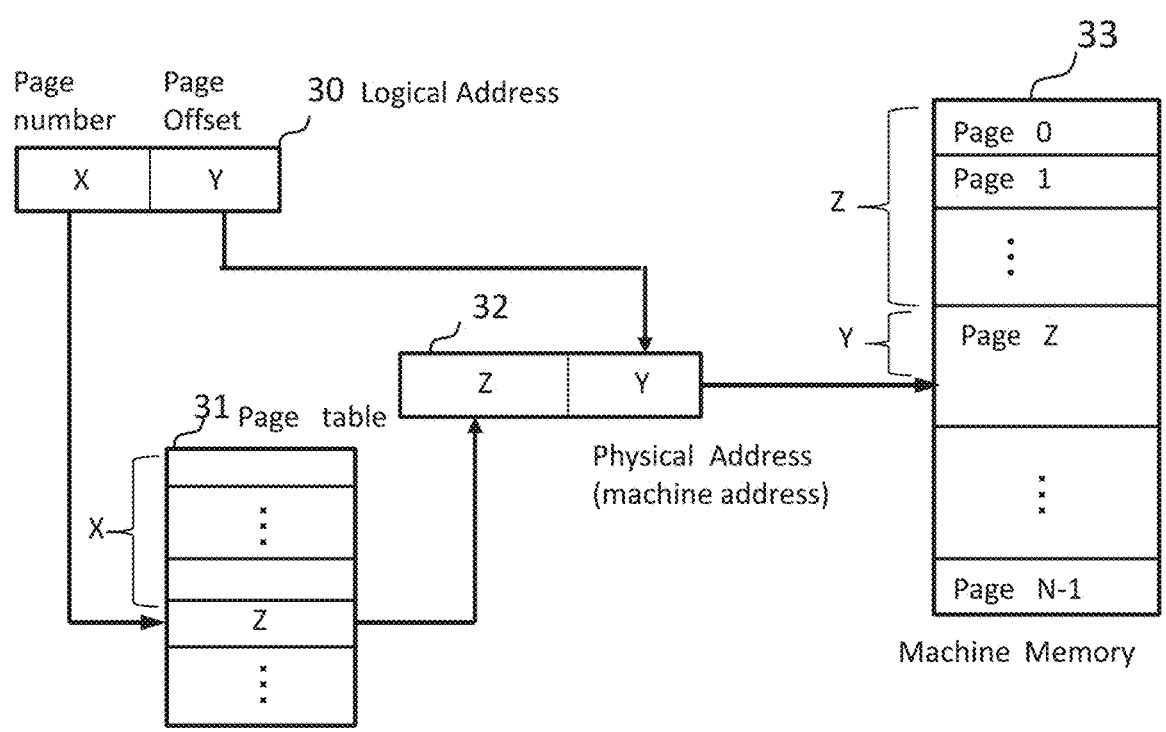
FIG. 11B is a diagram illustrating a paging.

The MMU-based memory protections may be implemented by a page table as illustrated in FIG. 11B. It is noted that MMU is not limited to page based. MMU and for example, segment-based memory protection may also be employed.

A page is a fixed-length contiguous block (for example, 4 KB (Kilo Bytes)). A logical address (virtual address) 30 issued from a process includes page number field (n−m bits) and an offset field (m bits). In this case, a page size is $2^m$, where ^ indicates a power operator, and a memory address space for the process is $2^n$. The page number X (upper n−m bits) of the logical address 30 is extracted for supply to a page table 31 as an index (page entry). A value Z (p-bits) stored in the Xth entry of the page table 31 is read out from the page table 31. That is, the page table 31 performs page translation from X to Z. Generally, a bit length p of Z is longer than that of X. Z is combined, as upper bits, with lower to bits Y in the logical address 30 to generate a physical address 32 for supply to a memory (machine memory) 33. In this case, an offset address Y in the Z page in the memory 33 is accessed.

In the exemplary embodiment, the hyper visor 110 may be configured to retain in its own memory region, respective page tables for respective switch processes, thereby preventing any processes from tampering with the page translation.

For a shared memory region that is shared by switch processes, and OS/Hypervisor, there may be provided an access controller that controls read/write access from the switch process to the shared region, based on access control information, such that only OS/Hypervisor is allowed to perform write operation to the shared region.

Figure 2:
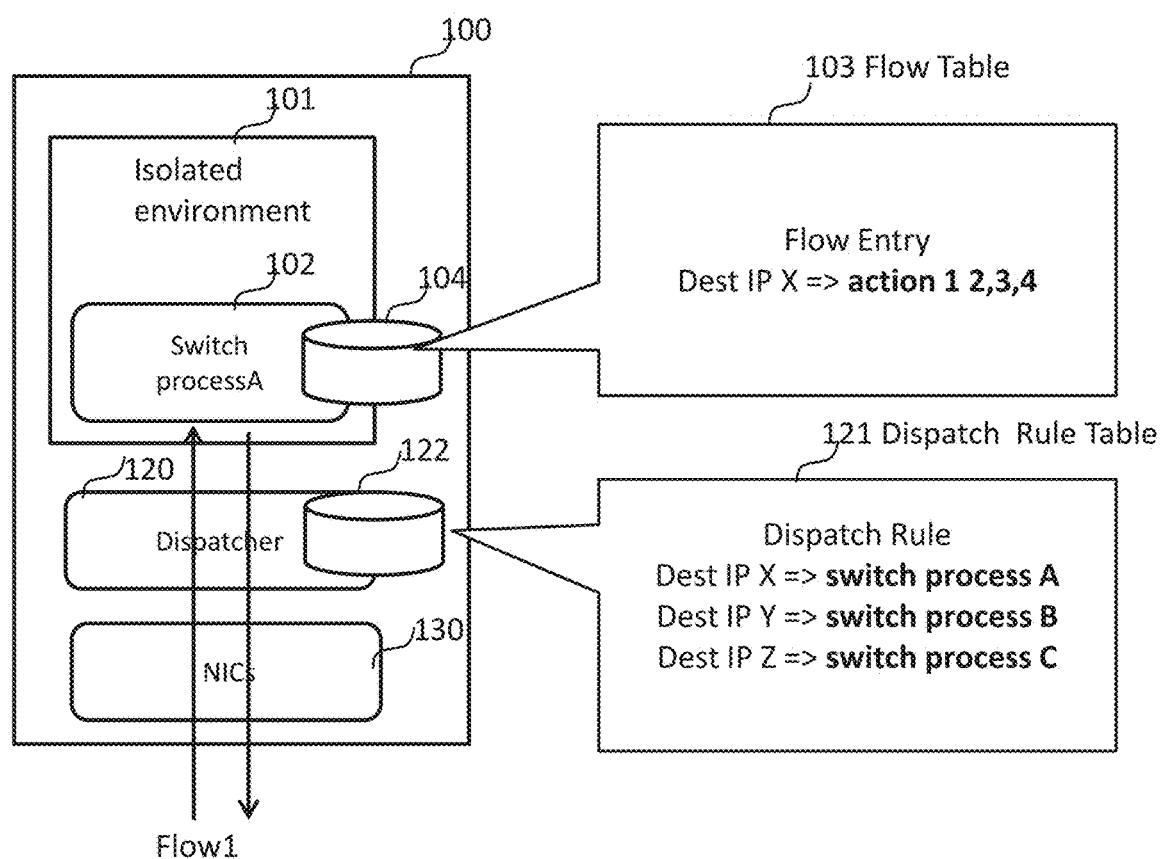
FIG. 2 is a diagram illustrating an example of the switch in the exemplary embodiment of the present invention.

FIG. 2 illustrates rules in the dispatcher 120 and the flow entry in the switch process 102 in the switch 100. The dispatcher 120 includes a dispatch rule table 121 that is stored in a storage 122. The dispatch rule table 121 includes one or more dispatch rules, each of which specifies an association of a flow in a flow field with a switch process in a process field, to which the flow is dispatched. It is noted that in FIG. 2, only for the sake of simplicity, a flow field (condition field) of the dispatch rule table uses only a destination IP address field, but one or more other fields of a packet header may be used to define a flow.

The dispatcher 120 performs analysis of an IP header of a received IP packet to extract a destination IP address field of the IP header and retrieves the dispatch rule table 121 to find a dispatch rule with a flow field matching with the destination IP address. In the example in FIG. 2, the dispatch rule table 121 includes three dispatch rule stating respectively as follows:

if a destination IP address field of a received packet header is X, then packet is dispatched to a switch process A, if a destination IP address field of a received packet header is Y, then packet is dispatched to a switch process B, and if a destination IP address field of a received packet header is Z, then packet is dispatched to a switch process C.

In this case, the dispatcher 120 dispatches a received IP packet with destination IP address: X to the switch process A.

Each switch process 102 arranged in the isolated environment 101 includes a flow table 103 including one or more flow entries, stored in a storage 104. Each flow entry in the flow table 103 includes at least a match field and an action field including a list of actions. The switch process 102 retrieves the flow table 103 using IP header field information of the received IP packet to find a flow entry giving a match filed matched with IP header field information. In this example, finding that the destination IP address X of the IP packet header dispatched to the switch process A by the dispatcher 120 matches to a match filed of the flow entry, the switch process A executes actions 1, 2, 3 and 4, as prescribed in the action field of the flow entry.

Figure 3:
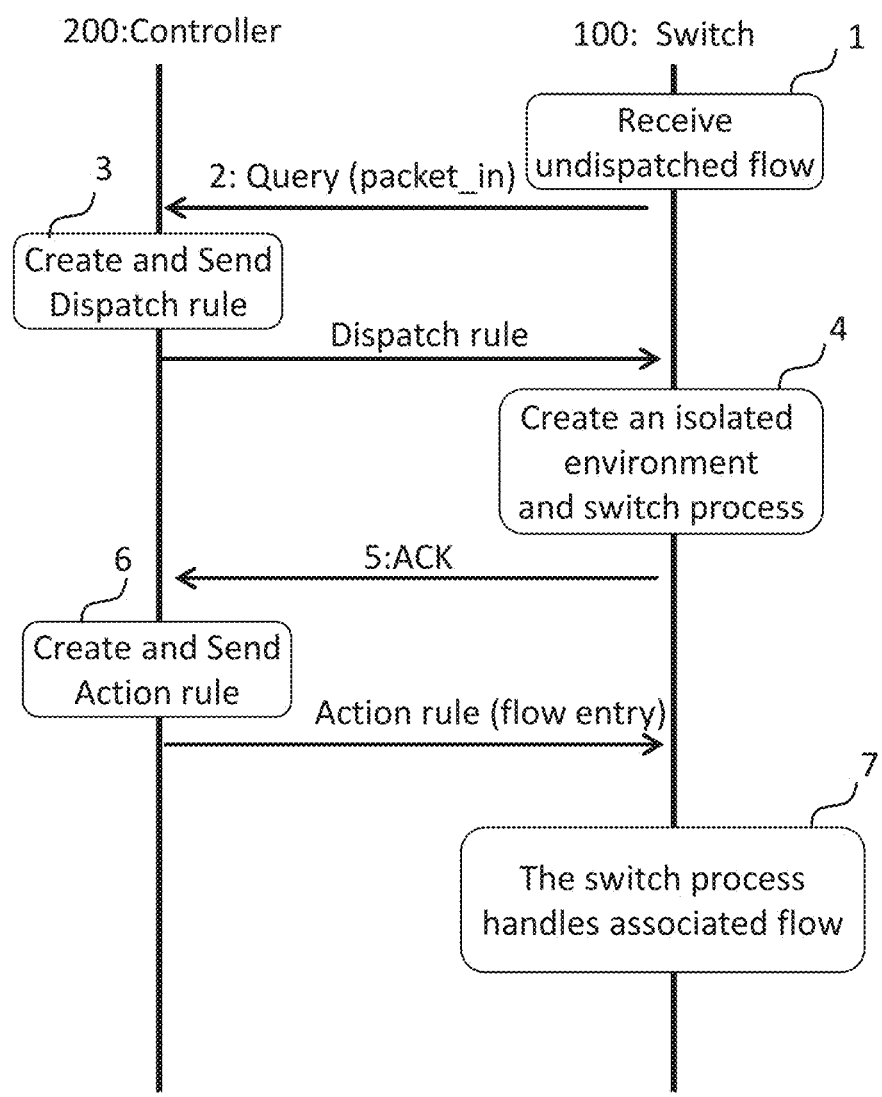
FIG. 3 is a diagram illustrating an example of the sequence in the exemplary embodiment of the present invention.

FIG. 3 depicts an example of a flow setup sequence in the switch 100 described with reference to FIG. 2.

The switch 100 receives an un-dispatched flow (1). The number 1 in the parentheses denotes a sequence number 1 in FIG. 3. The same maybe said of the following sequences. The un-dispatched flow is a flow (a new flow) to which no switch process corresponding the flow is not yet assigned (present) in the dispatch rule table 121, resulting in no-match.

The switch 100 sends a query to the controller 200 (2). More specifically, in the switch 100, when the dispatcher 120 fails to find an entry corresponding to the new flow in the dispatch rule table 121, the dispatcher 120 may inform the hypervisor 110 of the dispatch-failure (no-match) and then the hypervisor 110, as a transmitter, may send a query for a dispatch rule for the new flow via a communication network to the controller 200. For example, if a dispatch rule such as "Dest IP X=>process A", as illustrated in FIG. 2, is not present for a flow indicated by a destination IP address: X of the packet header in the dispatch rule table 121, the switch 100 sends a query for a dispatch rule for the new flow (Destination IP address: X).

The query sent from the switch 100 to the controller 200 may include at least a packet header of the captured packet in order to inform the controller 200 of the flow information. Though there is no specific limitation on the invention, the switch 100 may send, as the query, for example, a Packet-In message via a secure channel, using the OpenFlow protocol, to the controller 200. The Packet-In message includes a reason field indicating why the packet has been captured and forwarded to the controller and the captured portion of the packet (first packet). In this case, the reason field in the Packet-In message may include a code indicating that there is no dispatch rule present in the dispatch rule table that matches the flow indicated by the received packet.

On reception of the query from the switch 100, the controller 200 analyzes the IP packet header of the packet (first packet) included in the query, and creates a dispatch rule for the new flow. More specifically, a dispatch rule generation section (not shown) in the controller 200 creates, for example, a dispatch rule: "Dest IP X=>process A" for the new flow (Destination IP address: X).

In this stage, in the controller 200, there is a case wherein there is not yet assigned any controller process (that will be described herein after with reference to FIG. 6) associated with a new flow. In such a case, a predetermined control unit or a default controller process may analyze the IP packet header of the first packet and creates a dispatch rule for the new flow. The controller 200 sends the created dispatch rule to the switch (3).

The switch 100 receives the dispatch rule from the controller 200 and updates the dispatch rule table 121 with the dispatch rule, such as: "Dent IP X=>process A". Since a switch process (e.g., "process A") assigned to the new flow (e.g., Destination IP address: X) has not yet been present in the switch 100, the switch 100 creates an isolated environment 101 and invokes a switch process 102. (e.g., "process A") in the isolated environment 101 (4). The hypervisor 110 in FIG. 1 functions as a control section that is in charge of the creation of isolated environment 101 and invocation of the switch process 102. In the case where a switch process 102 (e.g., "process A") is already invoked in the isolated environment 101 but has not yet been associated with the new flow (Destination IP address: X), creation of the isolated environment 101 and invocation of the switch process 102 (e.g., "process A") are omitted.

The switch 100 then sends an acknowledgement response (ACK) to the controller 200 (5).

The controller 200, responsive to the ACK from the switch 100, calculates a new path, based on network topology information stored in a storage provided in the controller 200, and then creates and sends an action rule (flow entry) to the switch 100 and one or more other switches not shown on the path (6). In this stage, in the controller 200, if there has been already assigned and invoked a controller process (that will be described herein after with reference to FIG. 6) associated with the new flow, then the controller process may calculate a new path and creates and sends an action rule to the switch 100. In a Openflow system, the controller 200 sends a FlowMOD message including actions specifying what actions should be taken for matching packets (OpenFlow 1.y, where y=0) or match and instructions (OpenFlow 1.y, where y=1, 2, 3.0 or 3.1) to each of the switch 100 on the path.

The switch process 101 updates a flow table 103, with a rule (flow entry) sent from the controller 200, in the storage 104. The switch process 102 handles packets, following the first packet and belonging to the same flow as the first packet, according to the flow entry received from the controller (7). The controller 200 may send the first packet to an edge switch of the OpenFlow network using Packet out message and the first packet may be transmitted to the destination node from the edge switch.

Figure 4:
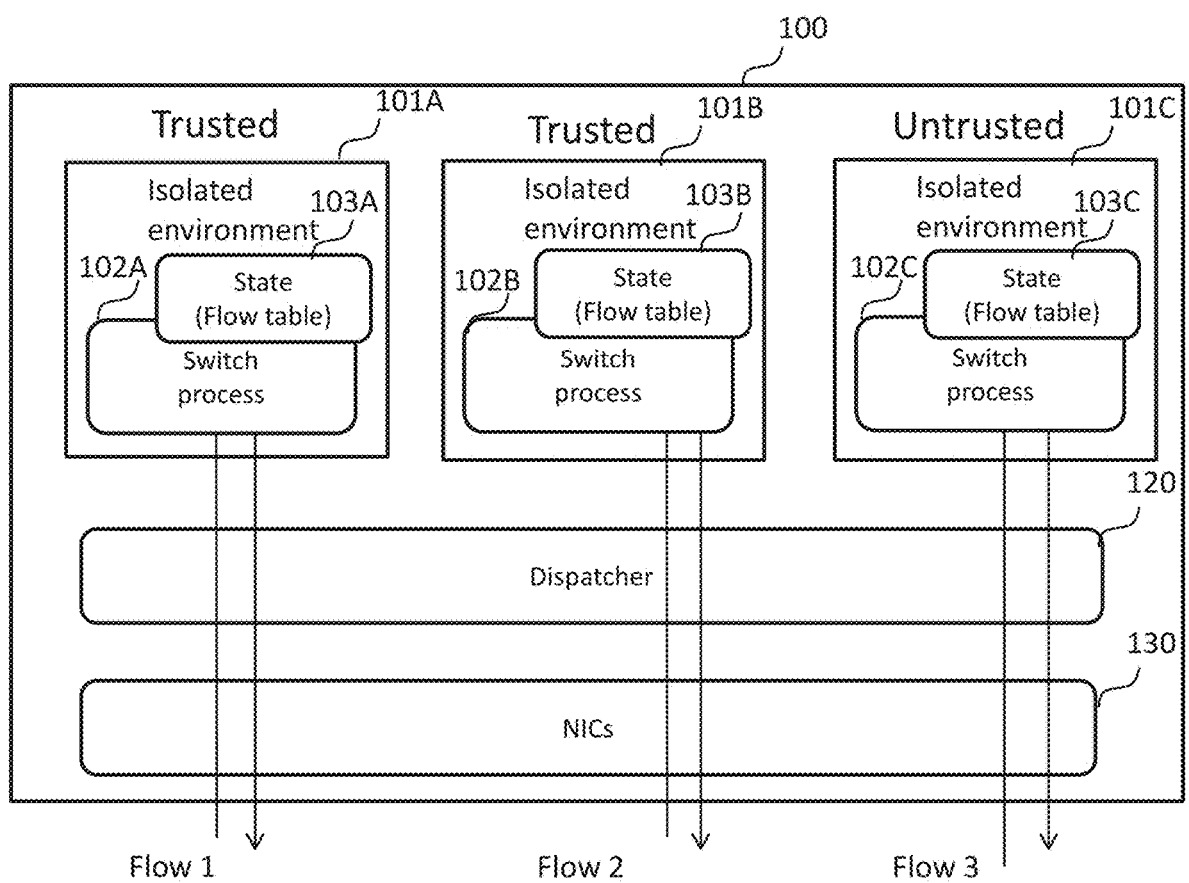
FIG. 4 is a diagram illustrating a variation of the switch in the exemplary embodiment of the present invention.

FIG. 4 illustrates a variation of the exemplary embodiments. In this example, security measure is selectively applied to processes to improve performance. More specifically, trusted switch process and Untrusted switch process can be deployed.

Trusted switch processes 102A and 102B are attested when they are created and also are running in the isolated environments 101A and 101B, respectively. For this reason, Trusted switch processes 102A and 102b are slow.

On the other hand, Untrusted switch process 102C in the isolated environment 101C is not attested, nor subjected to runtime protection, but is fast. Important/Confidential flows 1 and 2 are assigned to Trusted switch processes 102A and 102B.

Figure 5:
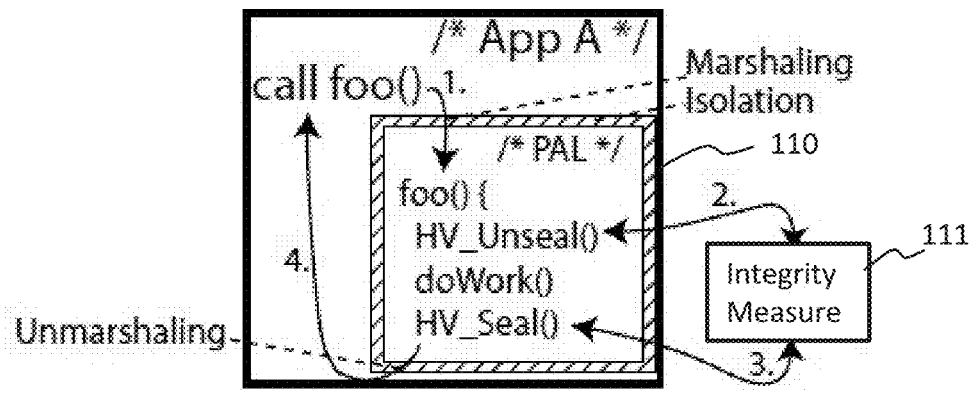
FIG. 5 is a diagram explaining an example of the switch in the exemplary embodiment of the present invention.

FIG. 5 illustrates an example of integrity measure as an example of security measure at run time for a process. This security measure may be adopted in Trusted switch processes 102A and 102B in FIG. 4. It is noted that FIG. 5 is cited from FIG. 4 in NPL 4 with some modification only for the sake of illustration.

A switch process (Application A) calls Function foo ( ) included in self-contained security-sensitive code blocks 110 in total isolation from OS such as legacy OS in NPL 4. Blocks 110 are called PAL (Pieces of Application Logic) according to NPL 4.

(1) Input parameters are marshaled from application (intrusted code) into the PAL 110.

(2) The function foo in the PAL, 110 invokes an integrity measure module 111 Unseal command (HV_Unseal( )) to decrypt previously created secrets. The integrity measure module 111 in FIG. 5 corresponds to μTPM (micro Trusted Platform Module) in NPL 4.

(3) After foo in the PAL serves its purpose: doWork( ), a sensitive state can once again be sealed using the integrity measure module 111: HV_Seal( ).

(4) Results (outputs) from the function foo in the PAL 110 are unmarshaled back to the application that has called the function foo ( ).

It is noted that marshaling may designate creating from Java object to XML (Extensible Markup Language) data, and unmarshaling may designate creating Java script from XML data, though not limited thereto.

The integrity measure module 111 that executes HV_Unseal( ) and HV_Seal( ) may be implemented in the hypervisor 110. HV_Unseal( ) can decrypt a ciphertext, only when the system is in a right status. When a relevant file in the system is tampered, since the system is not in a right status, HV_Unseal( ) fails to decrypt a ciphertext to prohibit an aggressor from reading a plaintext.

The integrity measure module 111 (µTPM) is configured to measure integrity and determine whether or not the system (integrity) is in a right status. The integrity measure module 111 is able to keep hash values, as integrity values, each used for sealing (encrypting) a file. When finding that a currently holding hash value and a hash value that is previously used for sealing a file are the same, the integrity measure module 111 deems that the system status is right to allow execution of Unsealing.

This mechanism in the integrity measure module 111 ensures that a system status (integrity) at a time when HV_Seal is executed and a system status (integrity) at a time when HV_Unseal is executed have been kept identical. That is, if a file, at a time when HV_Unseal is executed, has a state modified from that at a time when HV_Seal was executed thereto, HV_Unseal is not able to decrypt a cipher text of the file encrypted by HV_Seal.

In the function foo, at first decryption by HV_Unseal is executed and encryption by HV-Seal is executed at the end before exit or returning to a caller. When integrity is preserved, a ciphertext can be decrypted by HV_Unseal to a plane text, from/to which read/write is allowed by doWork, for example, in FIG. 5. That is, a sealed value is allowed to be unsealed and used only in the function foo and other processes or other functions cannot use the value. It is noted that reference should be made to NPL 4 regarding the details of PAL, µTPM, HV_Unseal and so forth.

The above mentioned integrity measure mechanism that can prevent rewriting to codes or data, along with the memory isolation may well serve to provide a process with runtime protection, such as intrusion protection.

At least a part of codes in the Trusted switch process 102 in FIG. 4 may be configured to call a function with codes sandwiched between Unsealing and Sealing, the code being located in total isolation from an legacy OS, as described in FIG. 5 to secure integrity.

Figure 6:
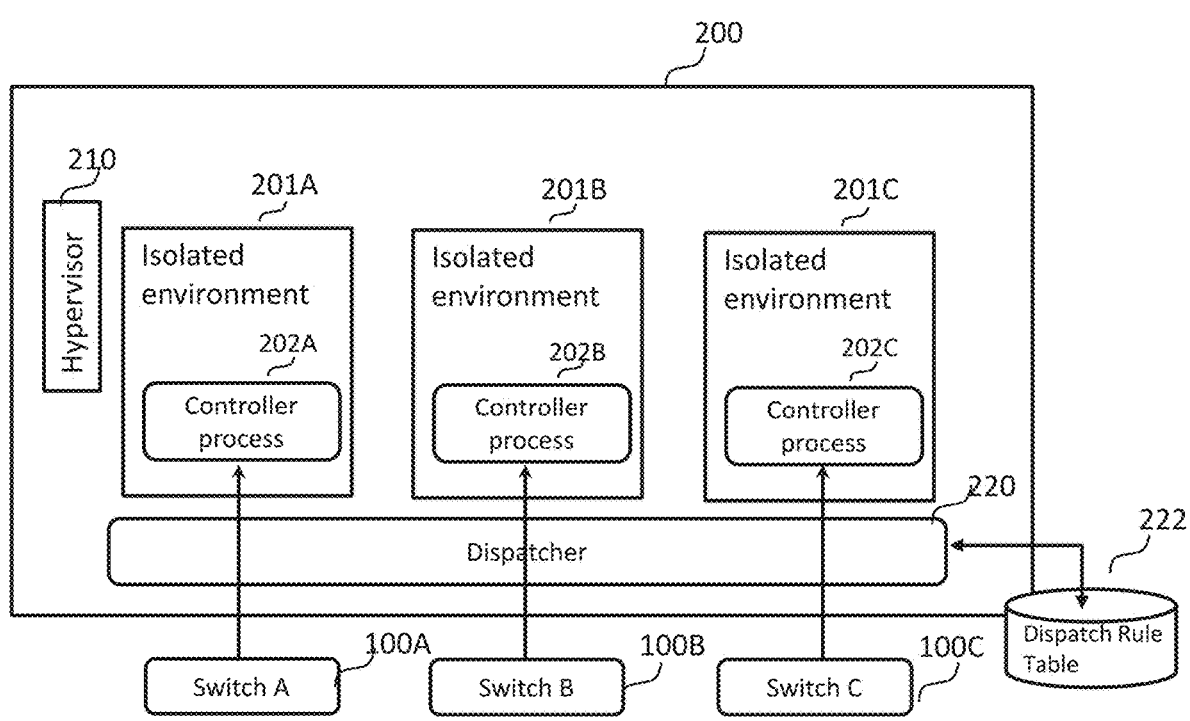
FIG. 6 is a diagram illustrating a controller in the exemplary embodiment of the present invention.

FIG. 6 is a diagram illustrating a controller 200 in the exemplary embodiment. Referring to FIG. 6, a hypervisor 210 creates isolated environments 201A to 201C and invokes controller processes 202A-202C in isolated environments 201A to 201C, respectively. Hypervisor 210 isolates controller processes 202A-202C as with the switch 100.

Dispatcher 220 receives a message (such as Packet-In message) from a switch 100 and dispatches the message to an associated controller process 202, based on a dispatch rule table stored in a storage 222.

The dispatch rule table stored in the storage 222 may include one or more dispatch rules, each of which defines a correspondence between a port ID that is connected to a switch and a controller process ID. Though not limited thereto, the correspondence between a port ID connected to a switch and a controller process ID may be determined, based on a trust level of the controller process and the switch, such that a message from an untrusted switch process as illustrated in FIG. 4 may be dispatched to an untrusted controller process and a message from a trusted switch process as illustrated in FIG. 4 may be dispatched to a trusted controller process.

At least a part of codes in the controller process 202 in FIG. 6 may be configured to call a function with codes sandwiched between Unsealing and Sealing, the code being located in total isolation from an OS, as described in FIG. 5 to secure integrity.

Figure 7:
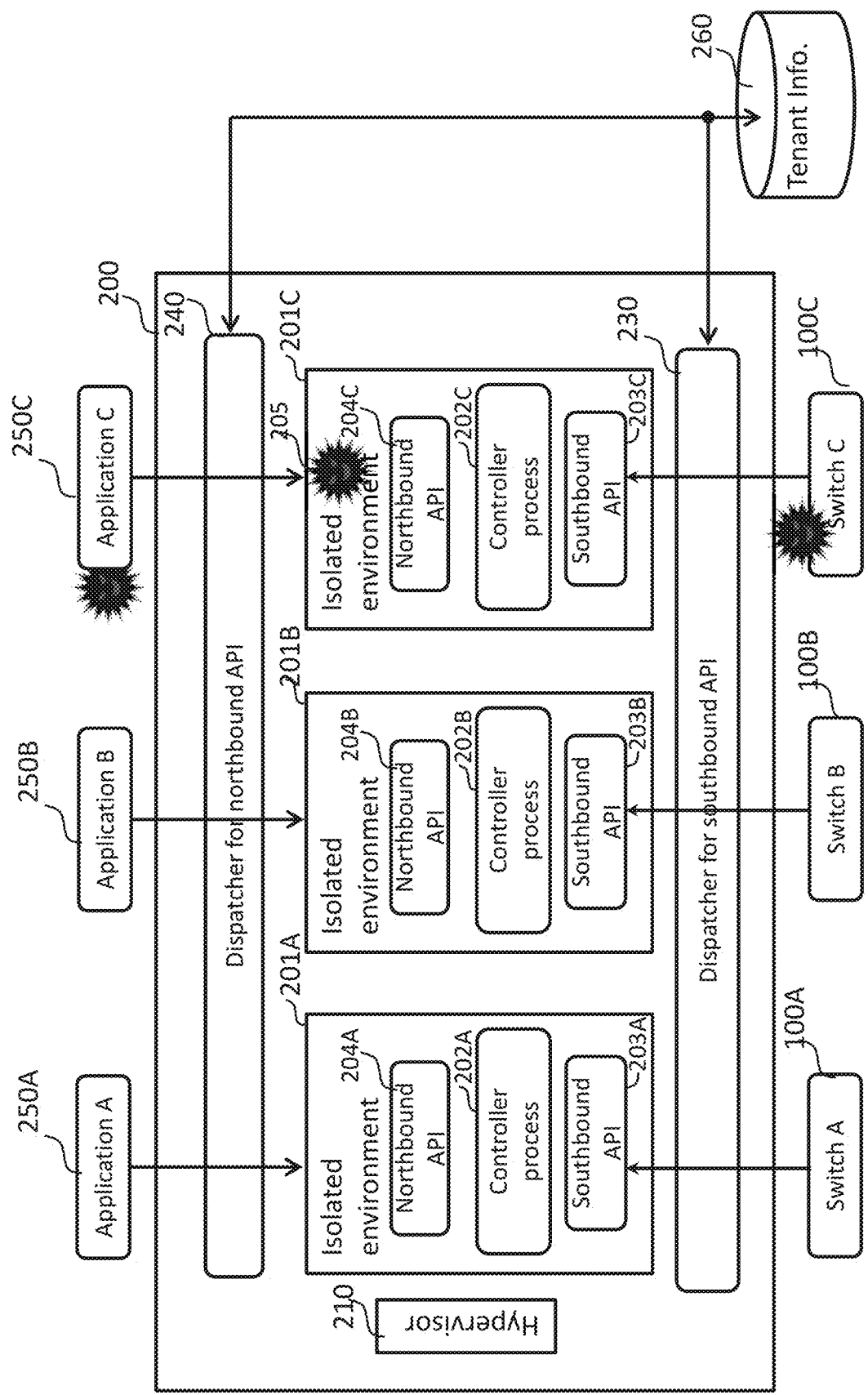
FIG. 7 is a diagram illustrating a variation of the controller in the exemplary embodiment of the present invention.

FIG. 7 is a diagram illustrating a variation of the controller 200. Referring to FIG. 7, controller processes 202A-202C are invoked by a hypervisor 210 in isolated environments 201A to 201C, respectively. Hypervisor 210 isolates controller processes 202A-202C as with switch 100. In this example, though not limited thereto, each tenant has a controller process allocated thereto. In FIG. 7, 205 designates a malware which is confined in the isolated environment 201C.

Dispatcher 230 (Dispatcher for southbound API) dispatches an API (Application Program Interface) call (packet) from a switch 100 (or switch process in the switch) to an associated Southbound API 203 and controller process 202. The API call sent from the dispatcher 230 is forwarded via Southbound API 203 to the controller process 202.

Dispatcher 240 (Dispatcher for northbound API) dispatches an API call from an application 250 (e.g., Load balancer, Firewall and so forth) to an associated Northbound API 204. The API call from the dispatcher 230 is forwarded via Northbound API 204 to the controller process 202.

The southbound APIs 203 (203A-203C) each allow the controller processes 202 (202A-202C) to define the behavior of switches at the bottom of the SDN stack. The northbound APIs 204 (204A-204C) each specify communication interface between the controller processes 202 (202A-202C) and the applications 250 (250A-250C) or higher layer control programs, at the top of the SDN stack. The applications 250 (250A-250C) are also called northbound applications.

In this example, the dispatchers 230 and 240 dispatches API calls on the basis of "tenant", though not limited thereto. Tenant information, serving as a dispatch rule based on "tenant", is stored in a storage 260. In FIG. 7, the tenant information used as a dispatch rule by the dispatchers 230 and 240 is stored in common in the storage 260 only for the sake of simplicity. The dispatch rule used by the dispatcher 230 for dispatching a message from a switch 100 (switch process) and the dispatch rule used by the dispatcher 240 for dispatching API call from a northbound application 250 are as a matter of course not necessarily to be the same and not necessarily to be stored in the same storage.

Figure 8:
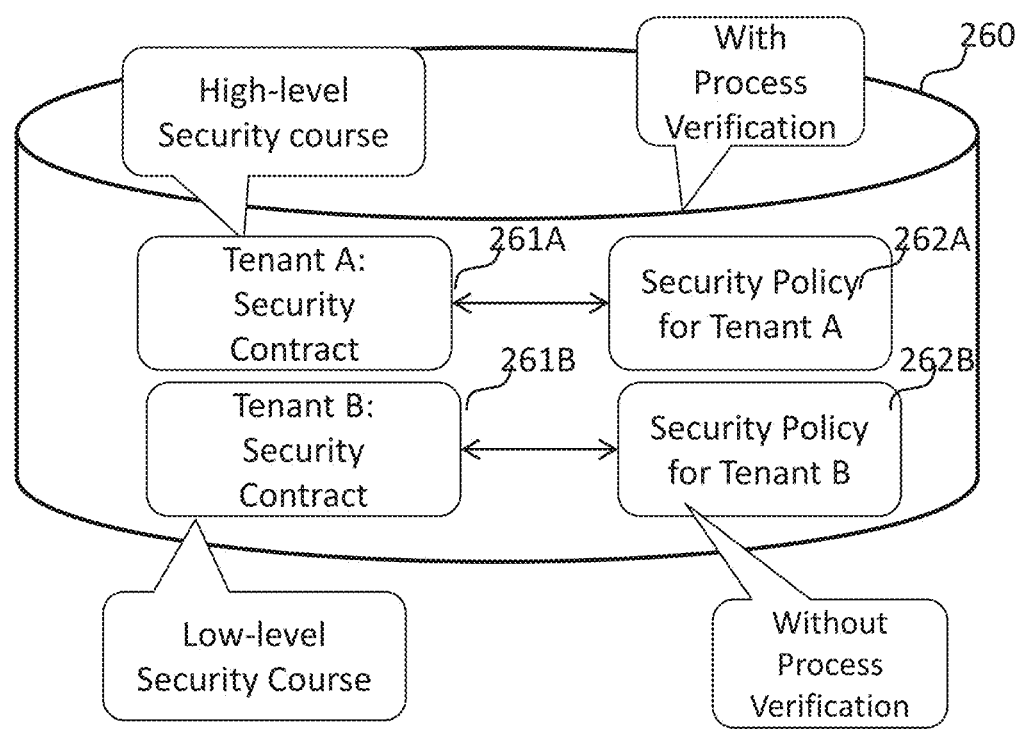
FIG. 8 is a diagram illustrating a variation of the controller in the exemplary embodiment of the present invention.

FIG. 8 is a diagram for explaining a tenant based security policy applied to an example described with reference to FIG. 7. FIG. 8 illustrates an example of tenant information stored in a storage 260. The security policy may be managed in connection with a tenant.

In a data center, an independent virtual network is provided for each tenant (customer). Each tenant may have a single controller allocated thereto according to contract. Security policy (security course) may be managed in connection with contract information of the tenants. In FIG. 8, only for the sake of illustration, there are stored, Tenant A Security Contract 261A with high level security course and Tenant B Security Contract 261B with low level security course.

There are prepared security polices for high-level security course and for low-level security course. The security level for protecting the controller and the switch connected with the controller may be determined based on the security contract of the tenant. In FIG. 8, only for the sake of illustration, there are stored, in the storage 260, Security Policy for Tennant A 262A with process verification, and Security Policy for Tennant B 262B without process verification.

The Security Policy for Tenant with process verification may well be implemented using, for example, integrity measure as described with reference to FIG. 5. A part of codes of the controller process 202 to which message for Tenant A is dispatched by the dispatcher 230, based on the security policy 262A, may include function call of a function with codes sandwiched between Unsealing and Sealing, the codes being provided in isolated environment, as described in FIG. 5.

Figure 9A:
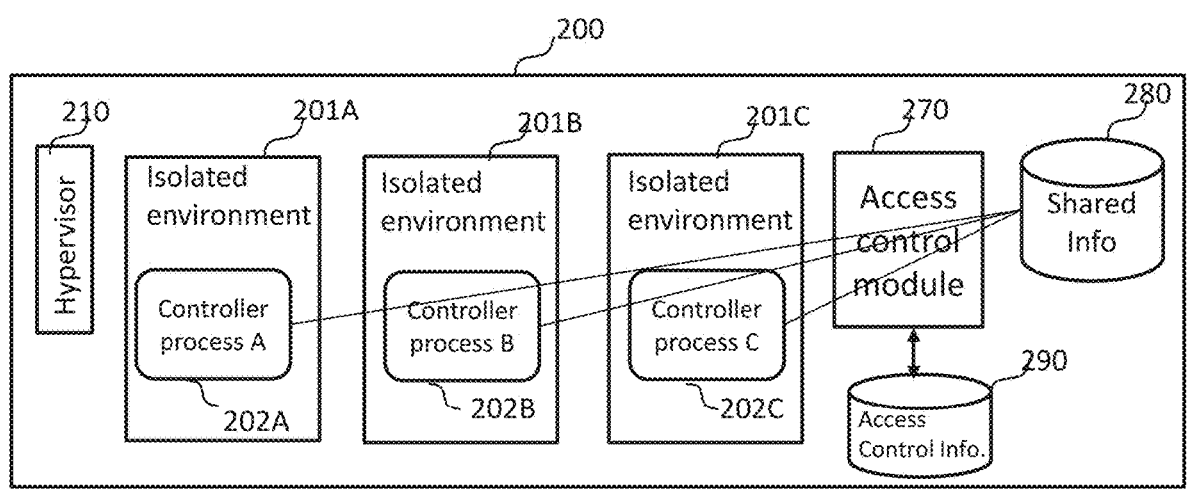
FIG. 9A is a diagram illustrating another variation of the controller in the exemplary embodiment of the present invention.

FIG. 9A illustrates a variation of the controller 200. Referring to FIG. 9A, the controller processes 202A to 202C provided in isolated environments 201A to 201C, access shared information stored in a storage 280 through an access control module 270.

The access control module 270 is connected to a storage 290 in which access control information including such as ACEs (Access Control Entities) is stored for each of shared objects. The access control information in the storage 290 may include, for example, on a per page basis, or on a per object basis, for a Controller Process or a group of Controller Processes, access enable/disable or access type information allowed to the shared information stored in the storage 280. Alternatively, the access control information in the storage 290 may include, for each Controller Process, access address range (defined by start address and end address) and access type allowed to the Controller Process, as illustrated in FIG. 9C.

When the access control module 270 receives an access request including an access command (read/write) and access address from any one of the controller processes 202A to 202C, the access control module 270 checks whether or not access is directed to the Shared information in the Storage 280. When the access is found to be directed to the Shared information in the Storage 280, the access control module 270 checks whether or not the access request is allowed, based on the access control information stored in the storage 290. If the result of the check of the access request passes, the access from the controller process to the shared information (shared region) is enabled. If the result of the check of the access request fails, the access from the controller process to the shared information (shared region) is disabled.

For example, in the case where the controller processes 202A and 202B belong to a trusted network and the controller process 202C belongs to untrusted network, the controller processes 202A and 202B are enabled to read and write the predetermined address range of the shared information and the controller process 202C is enabled only to read.

The access control module 270 may be included in the hypervisor 210. The storage 280 storing shared information therein may be a made up of a semiconductor memory (such as RAM (random access memory) or EEPROM (electrically erasable and programmable read only memory)), or a HDD (hard disk drive).

Figure 9B:
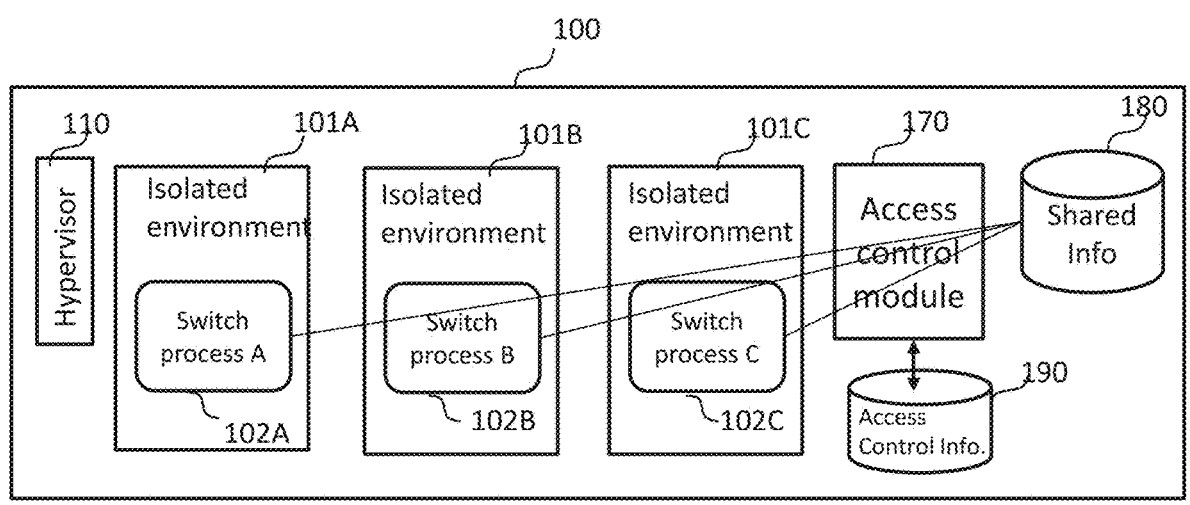
FIG. 9B is a diagram illustrating another variation of the switch in the exemplary embodiment of the present invention.

The above mentioned access control may be also implemented to the switch 100 as illustrated in FIG. 9B. Referring to FIG. 9B, the switch processes 102A to 102C provided in isolated environments 101A to 101C, may have an access to shared information stored in a storage 180 through an access control module 170. The shared information stored in a storage 180 includes such information shared by OS/Hypervisor and switch processes 102A to 102C. The access control using an access control module may also be applied to share resource other than shared information stored in a storage.

Figure 10:
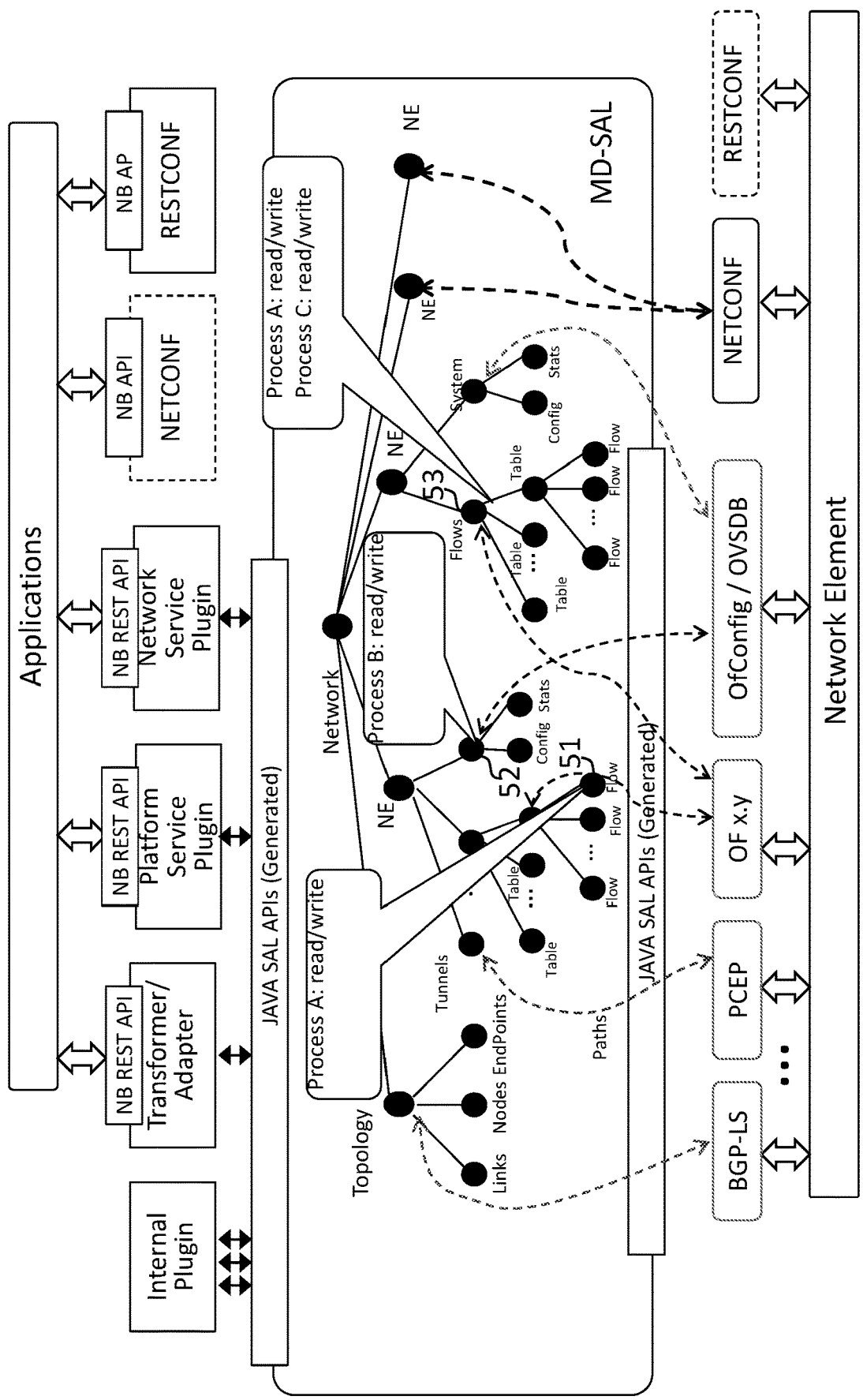
FIG. 10 is a diagram illustrating an example of access control of the exemplary embodiment applied to Model-Driven SAL in OpenDayLight.

FIG. 10 illustrates a variation of the exemplary embodiment. FIG. 10 is cited from Moving to Model-Driven SAL (Service Abstraction Layer) from NPL 5 with some markup balloons added thereto. The Model-Driven SAL (MD-SAL) in OpenDaylight, is one of frameworks that abstract exchange or conversion of data. In MD-SAL, such information as, network equipment (NE) information and topology to be managed are stored, as data model with a tree structure in a data store, as shown in FIG. 10.

In the exemplary embodiment, access control is applied to data store in the MD-SAL. More specifically, MD-SAL in OpenDaylight is stored as shared information in the storage 280 in FIG. 9A and shared by the controller processes 202A-202C. In FIG. 10.

BGP-LS: Border Gateway Protocol-Link Status, Border Gateway Protocol (BGP) is a standardized exterior gateway protocol designed to exchange routing and reachability information between autonomous systems (AS) on the Internet.

PCEP: Path Computation Element (PCE) Communication Protocol (IETF (Internet Engineering Task Force) RFC (Request for Comments) 5440).

OF x.y: OpenFlow protocol version x.y such as 1.0 or 1.3.

OF-Config: OpenFlow Management and Configuration Protocol.

OVSDB: Open vSwitch Database Management Protocol, a component of the open source Open vSwitch (virtual Switch) that is designed specifically to manage Open vSwitch implementations.

NETCONF: Network Configuration Protocol (IETF RF6241). NETCONF provides mechanisms to install, manipulate, and delete the configuration of network devices.

RESTCONF is a protocol to access data store in a REST format.

NB REST API: North Bound REST API is OpenDaylight API.

Nodes in MD-SAL stored as the shared information in the storage 280, are provided with access control information that specifies what process is allowed to read and write. In FIG. 10, on the nodes/flows designated by reference number 51, 52, and 53 that relate OpenFlow or vSwitch(virtual Switch), there are provided access control lists, as shown in markup balloons, respectively. With this example, control is performed such that an unauthorized controller process cannot have an access to the node information in MD-SAL.

Figure 12:
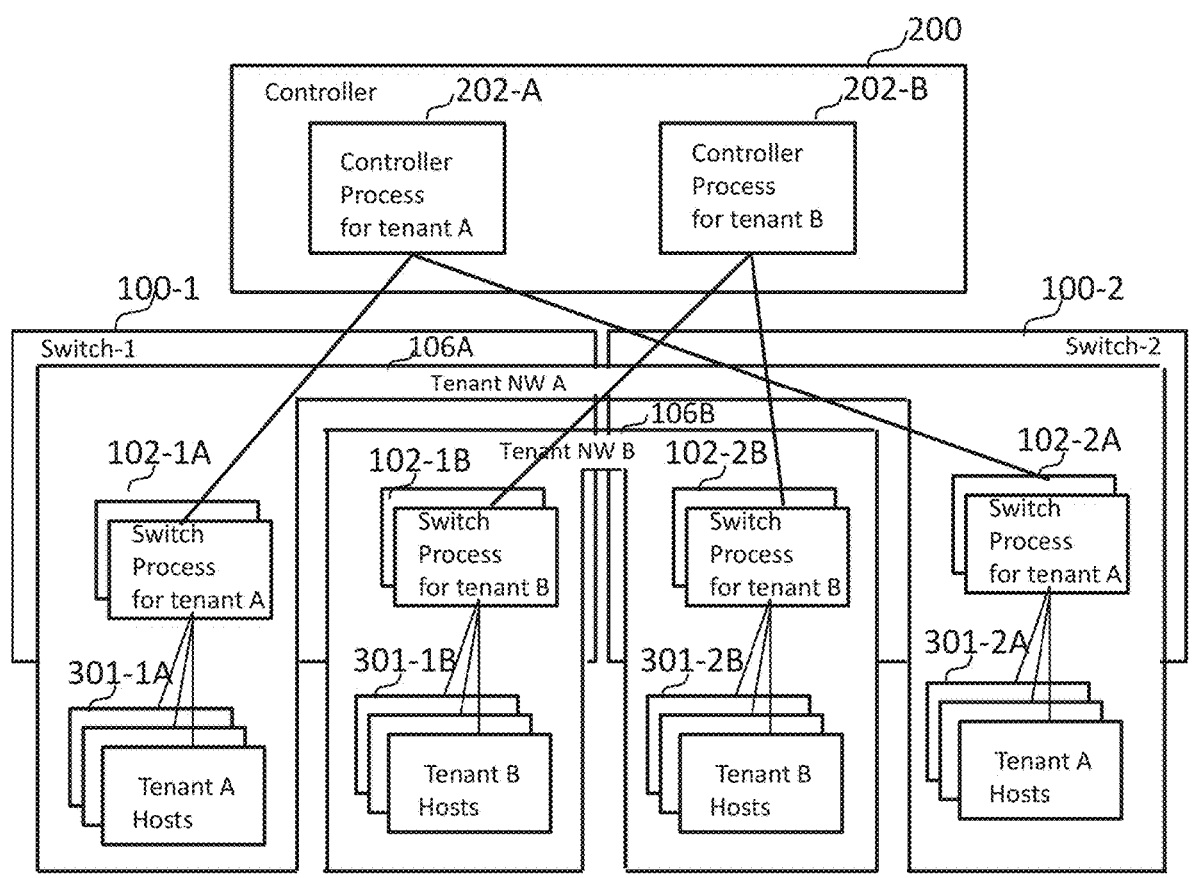
FIG. 12 is a diagram illustrating tenant based network isolation in the exemplary embodiment of the present invention.

FIG. 12 illustrates an example of a data center according to the exemplary embodiment. Controller 200 corresponds to the controller 200 as described with reference to FIG. 6 or FIG. 7. Switches 100-1 and 100-2 each correspond to the switch 100 as described with reference to FIG. 1 to FIG. 4. Referring to FIG. 12, a tenant based security policy is adopted in a data center network.

Tenant A hosts 301-1A and Tenant A hosts 301-2A are connected respectively to switch processes for tenant A 102-1A in the switch 100-1 and switch processes for tenant A 102-2A in the switch 100-2 to form a tenant network A.

The switch processes for tenant A 102-1A in the switch 100-1 and switch processes for tenant A 102-2A in the switch 100-2 are connected to Controller Process for tenant A 202-A.

Tenant B hosts 301-1B and Tenant B hosts 301-2B are connected respectively to switch processes for tenant B 102-1B in the switch 100-1 and switch processes for tenant B 102-2B in the switch 100-2 to form a tenant network B. The switch processes for tenant B 102-1B in the switch 100-1 and switch processes for tenant B 102-2B in the switch 100-2 are connected to Controller Process for tenant B 202-B. With this network configuration, assuming that the tenant network A is compromised, a contamination may be confined to the tenant network A and prevented from spreading over to the tenant network B, or to an entirety of tenant networks.

Figure 13:
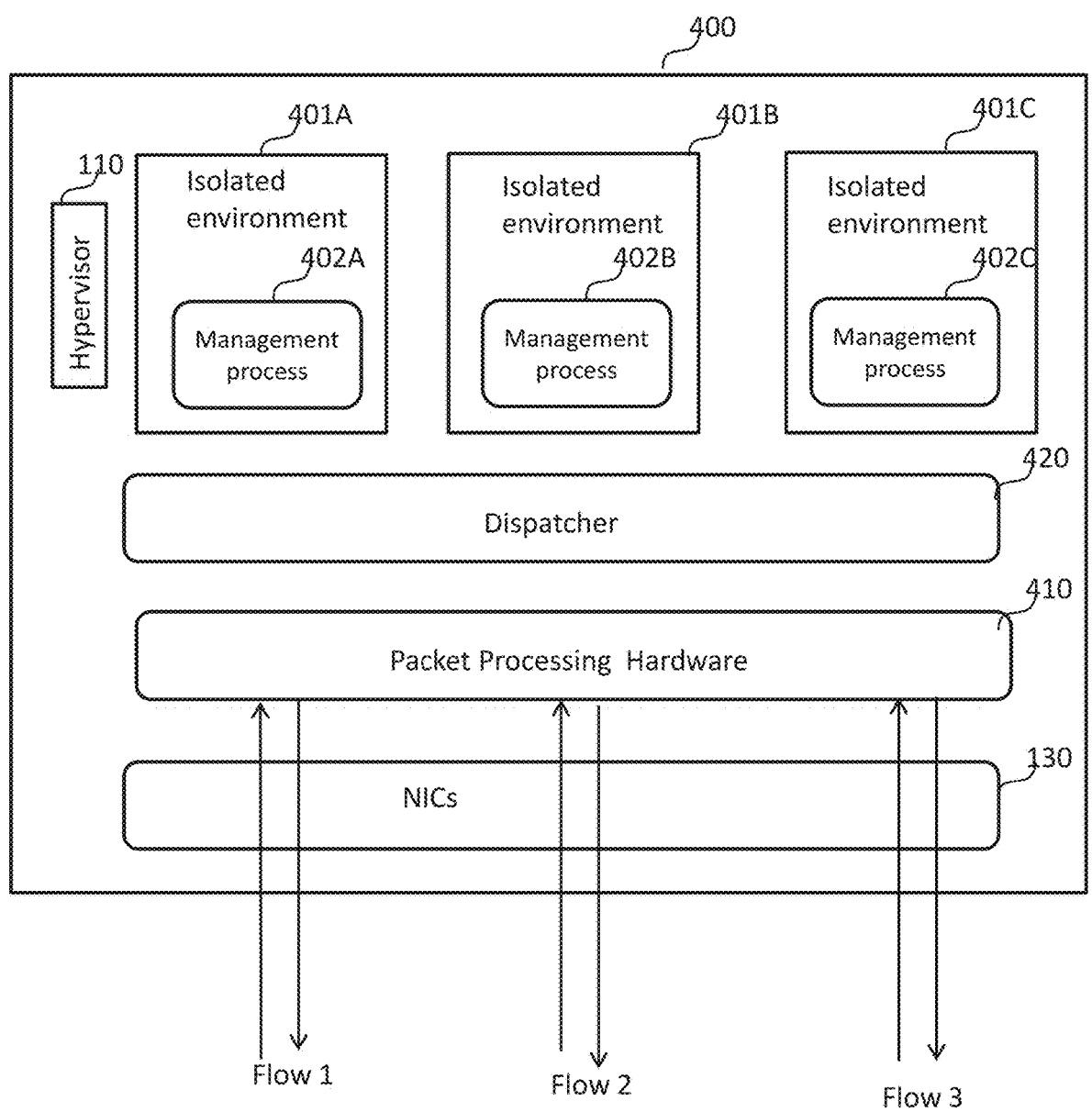
FIG. 13 is a diagram illustrating a switch in another exemplary embodiment of the present invention.

FIG. 13 illustrates a configuration of further variation in the exemplary embodiment. Referring to FIG. 13, a controller 400 includes a dispatcher 420 that is deployed between a packet processing hardware 410 and management processes 402A-402C which are invoked respectively in isolated environments 401A-401C.

In this embodiment, packet processing is performed by the packet processing hardware 410, and the management processes 402A-402C respectively communicate with associated controller processes in a controller, not shown in FIG. 13, via OpenFlow channels. Each of the management processes 402A-402C receives/deletes flow entries to/from the packet processing hardware 410. Then, the packet processing hardware 410 processes respective packets according to the flow entries.

Dispatcher 420 monitors additions and deletions of respective flow entries. When the packet processing hardware 410 receives a packet with a packet header which does not match flow entries, the packet processing hardware 410 notifies no-match to the dispatcher 420. Then, the dispatcher 420 transfers the notification to an associated one of the management processes 402A-402C, according to an associated dispatch rule, More specifically, the notification includes header field information of a received packet, such as IP address, MAC (Media Access Control) address, and VLAN (Virtual Local Area Network) tag, and the dispatcher 420 retrieves dispatch rules to find a rule that matches the header filed information of the packet, for determining a management process.

Furthermore the dispatcher 420 may be configured to check conflict between one or more flow entries and one or more dispatch rules. More specifically, in the case wherein a management process (e.g., 402A) tries to add a flow entry that conflicts with one or more dispatch rules of one or more other management processes (402B, 402C), the dispatcher 420 denies the flow entry. For example, assuming that a dispatch rule associates VLAN ID 123 with the management process 402B, when the management process 402A tries to input a flow entry whose match filed specifies VLAN ID=123, the dispatcher 420 denies the flow entry. Namely, the dispatcher 420 does not allow the management process 402A to add the flow entry in its flow table.

In the above exemplary embodiments, the arrangement in which a process is controlled to be executed in an isolated environment by a hypervisor are described, but the concept of the exemplary embodiments also may be applied to a process running on a processor adapted to be able to provide an isolation environment to the process, such as memory isolation without hypervisor. It is also noted that in the above exemplary embodiments, examples of application to Open-Flow switch and con oiler are described, but application of the present invention is, as a matter of course, limited to OpenFlow network.

Each disclosure of the above-listed Non Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

What is claimed is:

1. A communication apparatus comprising:
   a processor;
   a memory storing therein program instructions executable by the processor; and
   a plurality of network interfaces, each of the plurality of the network interfaces adapted to be connected to a network, wherein the processor is configured to execute:
   a plurality of switch processes, each of the plurality of the switch processes configured to be executed in an environment allocated thereto, the environment arranged for each of the plurality of the switch processes being isolated from each of one or more environments arranged for remaining one or more switch processes, each of the plurality of the switch processes performing switch processing on a flow associated thereto; and
   a dispatcher process that receives a packet from at least one of the plurality of the network interfaces and dispatches the packet to an associated switch process, based on a dispatch rule that defines association of a flow with a dispatch destination switch process,
   wherein the associated switch process, upon reception of the packet dispatched thereto by the dispatcher process, performs matching of header field information of the packet with a flow entry for handling a flow, and handling of the packet based on a result of the matching, wherein the flow entry includes a match field for being matched with header field information of a packet received; and an action field to prescribe handling of a matching packet,
   wherein the communication apparatus further includes;
   a transmitter that, when a dispatch rule for a first flow indicated by header field information of a packet received from at least one of the plurality of the network interfaces is not present, sends a query for the dispatch rule for the first flow to a controller that controls the communication apparatus, and
   wherein the processor is configured to, on receipt of the dispatch rule for the first flow sent from the controller, create an isolated environment, invoke a first switch process associated with the first flow in the isolated environment, and cause the transmitter to send a response to the controller, wherein
   the first switch process associated with the first flow, upon reception of a first flow entry for handling the first flow from the controller, handles one or more packets associated with the first flow, based on the first flow entry.

2. The communication apparatus according to claim 1, wherein the processor is configured to execute a switch process that performs an integrity control process that performs control to enable decryption of cipher text to plain text, when the integrity control process finds that a system integrity measured at a time of the decryption is identical as a system integrity measured at a time of encryption of the plain text.

3. A communication apparatus, comprising:
a processor;
a memory storing therein program instructions executable by the processor; and
a plurality of network interfaces, each of the plurality of the network interfaces adapted to be connected to a network, wherein the processor is configured to execute:
a plurality of management processes, each of the plurality of the management processes configured to be executed in an environment allocated thereto, the environment arranged for each of the plurality of management processes being isolated from each of one or more environments arranged for remaining one or more management processes, each management process performing communication with a controller that controls the communication apparatus; and
a dispatcher process,
wherein the communication apparatus further comprises
a packet processing hardware unit arranged between the plurality of the network interfaces and the dispatcher process, the packet processing hardware unit performing packet processing according to a flow entry for handling a flow, wherein a management process receives and deletes a flow entry to and from the packet processing hardware,
wherein the dispatcher process monitors addition and deletion of each flow entry for handling a flow and on reception of a notification sent from the packet processing hardware unit when there is no flow entry matching a packet header of a received packet, the dispatcher process forwards the notification to a corresponding management process according to a dispatch rule.

4. The communication apparatus according to claim 1, wherein the processor is further configured to execute:
an access control that controls access from a switch process to a shared resource shared by the plurality of the switch processes.

5. The communication apparatus according to claim 1, wherein the communication apparatus is a switch apparatus.

6. A controller apparatus comprising:
a processor;
a memory storing therein program instructions executable by the processor; and
a plurality of network interfaces, each of the plurality of the network interfaces adapted to be connected to a network, wherein the processor is configured to execute:
a plurality of controller processes, each of the plurality of the controller processes configured to be executed in an environment allocated thereto, the environment arranged for each of the plurality of the controller processes being isolated from each of one or more environments arranged for remaining one or more controller processes, each of the plurality of the controller processes performing control of one or more associated switch processes; and
a dispatcher process that dispatches a message from a switch to an associated controller process, based on a dispatch rule that defines association of a switch with a controller process to which a message from the switch is dispatched.

7. A communication system comprising:
a switch;
a controller to control the switch, wherein
the switch comprises:
a first processor;
a memory storing therein program instructions executable by the first processor; and
a plurality of network interfaces, each of the plurality of the network interfaces adapted to be connected to a network,
wherein the first processor is configured to execute:
a plurality of switch processes, each of the plurality of the switch processes configured to be executed in an environment allocated thereto, the environment arranged for each of the plurality of the switch processes being isolated from each of one or more environments arranged for remaining one or more switch processes, each of the plurality of the switch processes performing switch processing on a flow associated thereto;
and
a dispatcher process that receives a packet from at least one of the plurality of the network interfaces and dispatches the packet to an associated switch process, based on a dispatch rule that defines association of a flow with a dispatch destination switch process,
wherein the switch further includes;
a transmitter that, when a dispatch rule for a first flow indicated by header field information of a packet received from at least one of the plurality of the network interfaces is not present, sends a query for the dispatch rule for the first flow to the controller,
wherein the first processor is configured to, on receipt of the dispatch rule for the first flow sent from the controller, create an isolated environment, invoke a first switch process associated with the first flow in the isolated environment, and cause the transmitter to send a response to the controller, and
wherein the first switch process associated with the first flow, upon reception of a first flow entry for handling the first flow from the controller, handles one or more packets associated with the first flow, based on the first flow entry.

8. The communication system according to claim 7, wherein the associated switch process receives the packet dispatched from the dispatcher process, and performs matching of header field information of the packet dispatched from the dispatcher process with a flow entry for handling a flow and handling the packet dispatched from the dispatcher process based on a result of the matching, the flow entry including a match field for being matched with header field information of a packet and an action field to prescribe handling of a matching packet.

9. The communication system according to claim 7, wherein the switch further comprises:
a packet processing hardware unit arranged between the plurality of the network interfaces and the dispatcher process, the packet processing hardware unit performing packet processing according to a flow entry for handling a flow, wherein the dispatcher process monitors the flow entry for handling a flow.

10. The communication system according to claim 7, wherein the controller comprises:
a second processor;
a memory storing therein program instructions executable by the second processor, wherein the second processor is configured to execute:
a plurality of controller processes, each of the plurality of the controller processes configured to be executed in an environment allocated thereto, the environment arranged for each of the plurality of the controller processes being isolated from each of one or more environments arranged for remaining one or more controller processes, each of the plurality of the controller processes performing control of one or more associated switch processes; and
a first dispatcher process that dispatches a message from a switch process to an associated controller process, based on a first dispatch rule that defines association of a switch process with a dispatch destination controller process.

11. The communication system according to claim 10, wherein the second processor included in the controller is configured to execute:
a first interface process between the first dispatcher process and the plurality of the controller processes, the message being dispatched to the associated controller process via the first interface process, the first interface process and the associated controller process being arranged in common in the isolated environment;
a second dispatcher process that dispatches the message from an application to the associated controller process, based on a second dispatch rule that defines association of an application with a controller process to which the message from the application is dispatched; and
a second interface process between the second dispatcher process and the plurality of the controller processes, the message being dispatched to the associated controller process via the second interface process, the second interface process and the associated controller process being arranged in common in the isolated environment.

12. The communication system according to claim 10, wherein the second processor included in the controller is configured to:
upon reception of a predetermined message from the first switch process which is one of the plurality of the switch processes, generate a flow entry for handling the first flow that is applied for each of one or more switch processes inclusive of the first switch process on a path for the first flow, the flow entry including a match field for being matched with header field information of a packet received by the one or more switch processes and an action field to prescribe handling of a matching packet by the one or more switch processes; wherein the controller includes
a transmitter that sends the flow entry to each of the one or more switch processes on the path for the first flow.

13. The communication system according to claim 10, wherein the second processor included in the controller is configured to:
upon reception of a query sent from the switch when a dispatch rule for the first flow indicated by header field information of a packet received from at least one of the plurality of the network interfaces is not present in the switch, create the first dispatch rule for the first flow; and wherein the controller includes
a transmitter that sends the first dispatch rule for the first flow to the switch.

14. The communication system according to claim 10, wherein
when the dispatcher process of the switch receives a packet from at least one of the plurality of the network interfaces to find that the first flow indicated by header field information of the packet received is not registered in the dispatch rule, the switch sends the query for the dispatch rule for the first flow to the controller, wherein
the second processor included in the controller, upon reception of the query from the switch, creates the first dispatch rule for the first flow to cause a transmitter to send the first dispatch rule to the switch, wherein
the first processor included in the switch, upon reception of the first dispatch rule sent from the controller, creates the isolated environment and invokes the first switch process in the isolated environment and sends the response to the controller, wherein
the second processor included in the controller, upon reception of the response from the first switch process, creates the first flow entry including a match field for being matched with header field information of a packet and an action field to prescribe handling of matching packet to send the first flow entry to the first switch process invoked in the isolated environment, and wherein
the first switch process, upon reception of the first flow entry for the first flow from the controller, handles one or more packets associated with the first flow, based on the first flow entry.

15. The communication system according to claim 10, wherein at least one of the switch processes and the controller processes executes:
an integrity control process that performs control to enable decryption of cipher text to plain text, when the integrity control process finds that a system integrity measured at a time of the decryption is identical as a system integrity measured at a time of encryption of the plain text.

16. The communication system according to claim 10, wherein the first dispatcher process included in the controller performs dispatching from a switch process to an associated controller process, using tenant information as the first dispatch rule.

17. A communication method for a communication system including a switch and a controller, the method comprising:
dispatching a packet received by the switch to an associated switch process included in the switch, based on a dispatch rule that defines association of a flow with a dispatch destination switch process;
the associated switch process, out of a plurality of switch processes included in the switch, performing switch processing on a flow associated thereto, each of the plurality of the switch processes being configured to be executed in an environment allocated thereto, the environment arranged for each of the plurality of the switch processes being isolated from each of other one or more environments arranged for remaining one or more switch processes;
dispatching by the controller a message received from the associated switch process to an associated controller process, based on a dispatch rule that defines association of a switch process with a dispatch destination controller process; and
the associated controller process which is one of a plurality of controller processes included in the controller, performing control processing for the associated switch process included in the switch, based on the message, each of the controller processes configured to be executed in an environment allocated thereto, the environment arranged for each of the plurality of the controller processes being isolated from each of other one or more environments arranged for remaining one or more controller processes.

18. A non-transitory computer-readable recording medium storing therein a program to be executed by a computer, the program causing the computer to execute processes comprising:

a plurality of switch processes, each of the plurality of the switch processes being executed in an environment allocated thereto, the environment arranged for each of the plurality of the switch processes being configured to be isolated from each of one or more environments arranged for remaining one or more switch processes, each of the plurality of the switch processes performing communication processing on a flow associated thereto;

a dispatching process that receives a packet from at least one of a plurality of network interfaces and dispatches the packet to an associated switch process, based on a dispatch rule that defines association of a flow with a dispatch destination switch process, wherein the associated switch process, upon reception of the packet dispatched thereto by the dispatching process, performs matching of header field information of the packet with a flow entry for handling a flow, and handling of the packet based on a result of the matching, wherein the flow entry includes a match field for being matched with header field information of a packet received; and an action field to prescribe handling of a matching packet;

when a dispatch rule for a first flow indicated by header field information of a packet received from at least one of the plurality of the network interfaces is not present, sending a query for the dispatch rule for the first flow to a controller;

on receipt of the dispatch rule for the first flow sent from the controller, creating an isolated environment, invoking a first switch process associated with the first flow in the isolated environment, and sending a response to the controller; and the first switch process associated with the first flow, upon reception of a new flow entry for handling the first flow from the controller, handling one or more packets associated with the first flow, based on the new flow entry.

* * * * *